Patented May 16, 1933

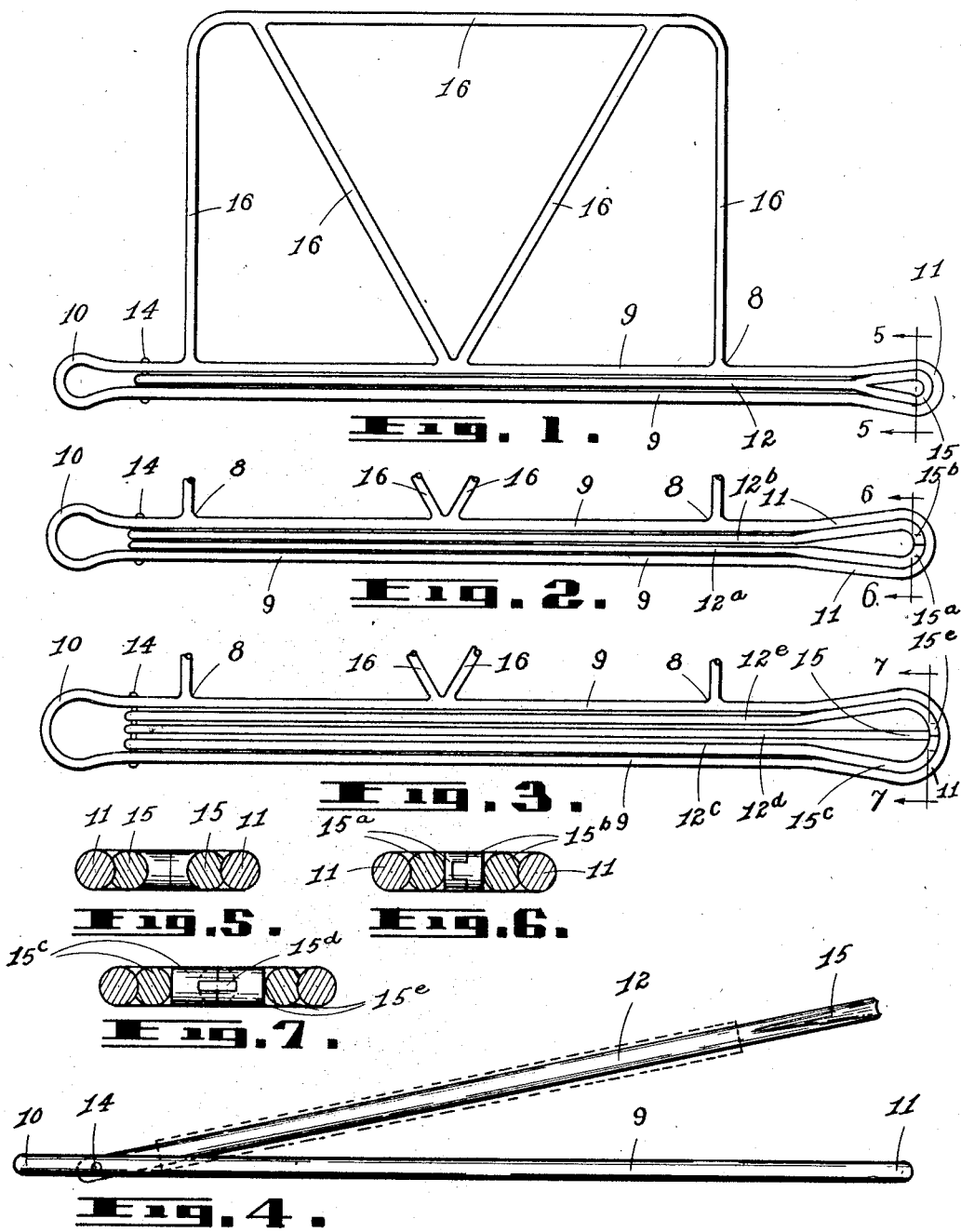

1,909,519

UNITED STATES PATENT OFFICE

PETER BRAUNSTEIN, OF MONTREAL, QUEBEC, CANADA

NEWSPAPER HOLDER

Application filed December 23, 1931. Serial No. 582,725.

This invention relates to a newspaper holder and its principal object is to provide a holder in which newspapers of one or more sections may be clamped and supported, which holder embodies a supporting frame and one or more retaining bars pivotally mounted therein.

A further object is in the provision of a locking means for retaining the retaining bar or bars in fixed relationship to the supporting frame when such bar or bars are moved to closed position.

A further object is in the provision of a newspaper holder of few parts, of simple construction and to which a newspaper section or sections may be easily arranged and efficiently held.

With these and other objects in view as will appear as the description proceeds, the invention consists of the novel construction, combination and arrangement of co-operating elements as hereinafter more specifically set forth, claimed and shown in the accompanying drawing forming a part of the present application, in which:

Fig. 1 is a plan view of the preferred embodiment of my invention.

Figs. 2 and 3 are similar views, with part of the supporting frame broken away, illustrating assemblies in which two and three retaining bars are shown respectively.

Fig. 4 is a side view of the preferred embodiment of my invention, the retaining bar being shown in partial raised position.

Fig. 5 is a transverse sectional view taken on the line 5—5 of Fig. 1.

Fig. 6 is a transverse sectional view taken on the line 6—6 of Fig. 2.

Fig. 7 is a transverse sectional view taken on the line 7—7 of Fig. 3.

Like numerals of reference designate corresponding parts throughout the different views.

The supporting frame 8 comprises a body portion consisting of side members 9; a hanger loop 10 at one end, preferably integral with the side members 9, and a handle loop 11, integral with the side members 9, at the opposite end. 12 is a retainer bar pivoted at one end, intermediate the side members 9, on the pivot pin 14 carried in the side members 9 and adjacent the hanger loop 10. The opposite end of the retainer bar 12 is looped back and preferably engaged upon itself to form the loop 15. The side members 9 and the handle loop 11 are preferably annular in cross section. The outer contour of the end loop 15, of the retainer bar 12, is grooved to provide for a locking engagement between its outer contour and the inner contour of the handle loop 11. The resiliency of the material forming the side members 9, handle loop 11 and retainer bar 12 will provide for a snug locking engagement when the loop 15 is pressed into normal closed position in the loop 11. If desired, an auxiliary supporting frame 16 may be attached to or form an integral part of one of the side members 9 and extend outwardly therefrom.

Referring to Figs. 2 and 6, the supporting frame 9—10—11 and the pivot pin 14 are substantially the same as hereinbefore described, other than the width between the side members 9 is sufficiently greater to permit two retainer bars 12a and 12b to fit therebetween substantially in parallel alignment. One end of each retainer bar 12a and 12b is pivotally connected, on the pivot pin 14, to the supporting frame 8. Their opposite ends 15a and 15b together form a loop, the respective ends being interlocked, as illustrated in Fig. 6. The end 15a is formed with a transverse groove and the end 15b is formed with a complementary tongue.

Referring to Figs. 3 and 7, the supporting frame 9—10—11 and the pivot pin 14 are substantially the same as hereinbefore described, other than the width between the side members 9 is sufficiently greater to permit three retainer bars 12c, 12d and 12e to fit therebetween substantially in parallel alignment. One end of each retainer bar 12c, 12b and 12d is pivotally connected, on the pivot pin 14, to the supporting frame 8. The opposite ends 15c and 15e of the retainer bars 12c and 12e together form a loop. These respective ends are interlocked by the end 15d of the retainer bar as illustrated in Fig. 7. The ends 15c and 15e are each formed with a transverse groove and the end 15d is formed with a tongue over which each of the ends 15c and 15e interlock.

The newspaper holder, as hereinbefore described, may be made from any desired material and may be formed or stamped in any desired manner.

Throughout the specifications I have referred to my invention as a newspaper holder. I do not wish to be limited to my holder being used exclusively for newspapers, as the construction disclosed in this invention may be made in various sizes for use in holding folded sheets, journals, reports, magazines and any other records of this general classification. To adapt the construction for holding magazines or the like, the side members may be placed apart sufficient to accommodate the thickness of the magazine or other records.

The disclosures in Figs. 1, 4 and 5 illustrate the preferred embodiment of my invention for use in supporting a newspaper printed in one section. When positioning a newspaper into my holder, the retainer bar 12 is pivoted to open position; the newspaper is opened up flat at its centre pages; the central fold line of the newspaper is placed intermediate the side members 9 and the retainer bar 12 returned to normal position and locked.

The disclosures in Figs. 2 and 6 illustrate a modified form of my invention for use in supporting a newspaper printed in two sections. When positioning a newspaper into my holder of this type, the respective retainer bars 12a and 12b engage the respective sections of the newspaper in a similar manner to that hereinbefore described in reference to the retainer bar 12.

The disclosures in Figs. 3 and 7 illustrate a further modified form of my invention for use in supporting a newspaper printed in three sections. When positioning a newspaper into my holder of this type, the respective retainer bars 12c, 12d and 12e engage the respective sections of the newspaper in a similar manner to that hereinbefore described in reference to the retainer bar 12.

The foregoing specification and annexed drawing disclose the preferred embodiment of my invention, but it is to be understood that minor changes may be resorted to in the commercial adaptation of my invention without departing from the scope of the invention as hereinafter claimed.

What I claim as new is:

1. A newspaper holder embodying a supporting frame, comprising elongated side members, having a looped handle integral at one end and a pivot pin carried adjacent its opposite end and a retainer bar pivoted at one end on said pivot pin and adapted to swing into normal position substantially parallel with said side members and resiliently engage said looped handle.

2. A newspaper holder embodying a supporting frame, comprising elongated side members, having a looped handle integral at one end and a pivot pin carried adjacent its opposite end and a retainer bar pivoted at one end on said pivot pin and adapted to swing into normal position substantially parallel with said side members, the free end of said retainer bar and said looped handle being formed to provide a resilient locking therebetween.

3. A newspaper holder embodying a supporting frame, comprising elongated side members, having a looped handle integral at one end and a pivot pin carried adjacent its opposite end and retainer bars pivoted at one end on said pivot pin and adapted to swing into normal position substantially parallel with said side members, the free ends of said retainer bars being formed to provide interlocking with each other.

4. A newspaper holder embodying a supporting frame, comprising elongated side members, having a looped handle integral at one end and a pivot pin carried adjacent its opposite end and retainer bars pivoted at one end on said pivot pin and adapted to swing into normal position substantially parallel with said side members, the free ends of said retainer bars being formed to provide interlocking with each other and said supporting frame.

5. A newspaper holder embodying a supporting frame, comprising elongated side members, having a looped handle integral at one end and a pivot pin carried adjacent its opposite end and retainer bars pivoted at one end on said pivot pin and adapted to swing into normal position substantially parallel with said side members, the free ends of said retainer bars being formed to provide interlocking with each other and the interlocked ends of said retainer bars and said looped handle being formed to provide resilient locking therebetween.

6. A newspaper holder embodying a frame, having spaced parallel side portions, and a retainer bar pivotally carried intermediate said side portions, the free end of said retainer bar adapted to resiliently engage said side portions.

7. A newspaper holder embodying a frame, having spaced parallel side portions, and retainer bars pivotally carried intermediate said side portions, the free ends of said bars being formed to provide interlocking with each other and said frame.

In testimony whereof, I affix my signature.

PETER BRAUNSTEIN.